United States Patent Office 3,574,178
Patented Apr. 6, 1971

3,574,178
PRODUCTION OF VINYLIDENE FLUORIDE POLYMERS
Yasushi Toyoda and Nobuo Bannai, Iwaki-shi, Japan, assignors to Kureha Kagaku Kogyo Kabushiki Kaisha, Tokyo-to, Japan
No Drawing. Filed Apr. 4, 1968, Ser. No. 718,924
Claims priority, application Japan, Apr. 14, 1967, 42/23,742
Int. Cl. C08f 1/11, 3/22
U.S. Cl. 260—92.1                                3 Claims

ABSTRACT OF THE DISCLOSURE

Suspension polymerization of vinylidene fluoride monomer is carried with the use of from 0.1 to 200 parts by weight of a water-soluble solvent such as methanol, ethanol, dioxane, or a mixture thereof relative to 100 parts by weight of water, this water-soluble solvent being used as an agent for regulating the degree of polymerization and particle size of the resulting polymer product. In addition, a dialkylperoxydicarbonate and a suspending agent such as a polyvinyl alcohol or a cellulose are used in the polymerization process.

BACKGROUND OF THE INVENTION

This invention relates generally to the production of vinylidene fluoride polymers and more particularly to a new method for producing vinylidene fluoride polymers in the form of fine powder by suspension polymerisation in water and solvent disperse systems (or dispersions).

By suspension polymerisation in a water disperse system to produce a vinylidene fluoride polymer, uniform and stable polymer particles can be obtained, but since these particles are of relatively large size, they are not suitable, in some cases, for use in processes such as fluid lining, spray coating, and dispersion coating. On the other hand, by emulsion polymerisation, only very fine particles can be obtained, which particles are not suitable for particle coating such as fluid lining.

Furthermore, as a method of regulating the degree of polymerisation of vinylidene fluoride, use is made of a polymerisation regulator such as carbon tetrachloride or chloroform. In some instances, the polymerisation catalyst, itself, acts as a polymerisation regulator, and it is possible to regulate the degree of polymerisation by suitably varying the quantity of this catalyst. In general, however, a vinylidene fluoride polymer obtained by polymerisation in which a substance such as carbon tetrachloride or chloroform has been used, or a catalyst has been used in a large amount has poor thermal stability and becomes coloured when melted.

In addition, it is also possible to use cyclohexane or a chain-structure, saturated hydrocarbon as a polymerisation regulator for vinylidene fluoride. In this case, while a polymer having extremely high thermal stability and excellent workability can be obtained, the process is accompanied by the problem of substantially reduced polymerisation speed.

We have previously succeeded in suitably controlling the particle size and degree of polymerisation without causing a drop in the polymerisation speed and in producing polymer particles of high thermal stability by carrying out suspension polymerisation of vinylidene fluoride in a disperse system in which a lower ketone or t-butanol is used either singly or as an aqueous solution. This method is described in United States patent application Ser. No. 595,018 now abandoned.

We have found further that it is possible to regulate suitably the particle size and degree of polymerisation, without impairing the polymerisation speed and thermal stability of the resulting polymer, also by using an aqueous solution of a water-soluble solvent such as a $C_1$–$C_2$ saturated alcohol or dioxane.

SUMMARY OF THE INVENTION

It is an object of the present invention to provide a method for producing vinylidene fluoride polymers of controllably variable particle size, degree of polymerisation, and other properties such as apparent (or bulk) density and intrinsic viscosity without impairing the polymerisation speed and thermal stability of the resulting polymer product.

An ultimate object of the invention is to provide an economical process for producing vinylidene fluoride polymers having controllably variable properties highly suitable for uses of the polymers in various coating and lining operations such as spray coating, dispersion coating, and fluid lining.

According to the present invention, briefly summarised, there is provided a method for producing vinylidene fluoride polymers of regulable particle size by suspension polymerisation of vinylidene fluoride monomer with the use therein of from 0.1 to 200 parts by weight of a water-soluble solvent selected from methanol, ethanol, dioxane, and mixtures thereof with respect to 100 parts by weight of water, the water-soluble solvent being used as an agent for regulating the degree of polymerisation and particle size of the resulting polymer product.

The nature, details, and utility of the invention will be more clearly apparent from the following detailed description beginning with a consideration of general aspects of the invention and concluding with specific examples of preferred embodiment thereof.

DETAILED DESCRIPTION

The vinylidene fluoride radical has a very strong hydrogen-pulling action, and most organic solvents, having strong action as chain transfer agents, consequently are not suitable as solvents for producing high polymers of vinylidene fluoride.

While the aforementioned solvents which we have previously proposed are exceptional organic solvents which produce excellent high polymers of vinylidene fluoride, we have found that an aqueous solution prepared by diluting a water-soluble solvent such as a $C_1$–$C_2$ alcohol or dioxane with water of a quantity of at least one half the weight of the water-soluble solvent can also be used as a solvent for suspension polymerisation of vinylidene fluoride and that, by selectively varying the kind and concentration of this solvent, it is possible to regulate controllably the degree of polymerisation and the particle size of the product. By using this solvent in accordance with the invention, we have succeeded in producing high polymers of vinylidene fluoride of much smaller particle size than those which can be obtained through the use of only water as a solvent.

While polymers produced by conventional emulsion polymerisation have particle sizes which are ordinarily from 0.1 to 0.2 micron and are suitable for dispersion coating, these particle sizes are too small for spray coating and give rise to "mud cracking." Furthermore, these polymers are excessively light for fluid lining and tend to scatter. Because of these disadvantageous features, such polymers have been unsuitable for spray coating and fluid lining.

On the other hand, suspension polymerisation with only water as a dispersion medium ordinarily produces polymers of excessively large particle size of the order of from 100 to 300 microns, which cannot form good fluid layers and are unsuitable for use in powder coating.

The polymers produced in accordance with the present invention have particle sizes freely selectable in the range of from 1 to 200 microns. While these polymers can, of course, be formed into ordinary shaped articles and structures, including films, they are particularly suitable for coating and covering purposes such as spray coating, fluid lining, and dispersion coating (i.e., coating with a polymer dispersed in a solvent).

While methanol (methyl alcohol) ethanol (ethyl alcohol), dioxane, and other solvents can be used as water-soluble solvents in the method of the invention, methanol and ethanol are preferable since they have the desirable characteristics of little chain transfer action and the effect of lowering the surface tension of the dispersion medium.

While radical-generating catalysts such as peroxycarbonates, in general, can be used as polymerisation catalysts, a particularly suitable catalyst is a diakylperoxydicarbonate representable by the general formula

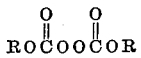

(where R is a radical selected from methyl, ethyl, n-propyl, isopropyl, n-butyl, isobuty, sec-butyl, and t-butyl radicals). This catalyst is used in a quantity of from 0.01 to 5 percent by weight, preferably from 0.1 to 1.0 percent by weight, relative to the vinylidene fluoride monomer.

While the polymerization can be carried out at a polymerisation temperature of from −50 to +50 degrees C., the most suitable range is from 10 to 30 degrees C. for obtaining good results with respect to the polymer particle state and polymerisation speed.

For the suspending agent, substances such as polyvinyl alcohols, celluloses, gelatines, and carboxymethyl-celluloses can be used, but the use of a polyvinyl alcohol or a cellulose in a quantity of from 0.1 to 1.0 percent relative to the monomer is preferable. While the polymerisation can be carried out with a (monomer/water) ratio of ½ or less, a (monomer/water) ratio of from ½ to ⅓ is preferable from the viewpoint of productivity.

The ratio with respect to the solvent can be freely varied depending on the magnitude of the chain transfer action of the solvent, the degree of polymerisation (expressed in terms of inherent viscosity $\eta_{inh}$ of the polymer desired, and the desired particle size of the polymer. However, if the solvent concentration is excessively high, the degree of polymerisation of the resulting vinylidene fluoride polymer will be excessively low, and a polymer for forming a strong film cannot be produced. In general, from 200 to 0.1 parts by weight of the solvent relative to 100 parts by weight of water is used.

Furthermore, the chain transfer action of the solvent differs, of course, with the kind of solvent, methanol exhibiting the weakest action, and among the same primary saturated alcohols, the chain transfer action increases with increasing number of carbon atoms. Accordingly, an even more preferable concentration range is from 1 to 200 parts by weight in the case of methanol and from 0.5 to 100 parts by weight in the case of ethanol with respect to 100 parts by weight of water.

Among lower alcohols sold on the general market, however there are some in which aldehydes are present. Since aldehydes greatly impair the poylmerisation of vinylidene fluoride, it is necessary to ensure that the alcohol to be used does not contain aldehydes.

Preferable polymer particle sizes are below 40 microns for spray coating and dispersion coating and from 100 to 150 microns for fluid lining. While polymers having intrinsic viscosities $\eta_{inh}$ (an indication of the degree of polymerisation, measured on the basis of 0.4 g./100 cc. DMF, at 30 degrees C.) of from 0.2 to 2.0 can be easily prepared, we have found that polymers having $\eta_{inh}$ of from 0.8 to 1.30 produce the most satisfactory results in coating.

The apparent or bulk density of the polymer is a very important property for the above mentioned applications and is preferably over 50 g./dl. However, this value also can be radily varied to suit the application by further adding the monomer during the polymerisation process.

Thus, the present invention provides a method by which, in comparison with known methods, vinylidene fluoride polymer powders of highly desirable properties can be produced with simple and low-cost process steps.

In order to indicate still more fully the nature and utility of the invention, the following specific examples of procedure embodying the invention and results are set forth, it being understood that these examples are presented as illustrative only and that they are not intended to limit the scope of the invention.

Example 1

2,600 grams (g.) of water, 720 g. of methanol, 10.8 g. of methylcellulose, 12 g. of diisophopylperoxydicarbonate uses as a polymerisation catalyst, and 2.4 g. of sodium pyrophosphate ($Na_4P_2O_7 \cdot 10H_2O$) are charged into a 6-litre stainless-steel autoclave (of an inner diameter of 130 mm. and a depth of 470 mm.), which is then thoroughly evacuated. Then, as the autoclave is maintained at a temperature below 20 degrees C. in a constant-temperature water bath, 1,200 g. of vinylidene fluoride monomer is conducted through a pipe from a monomer cylinder placed on a weighing balance to the autoclave and is thereby transferred and caused to condense within the autoclave.

During this process, the monomer cylinder is slightly heated since, otherwise, the temperature of the cylinder would drop because of the loss of the latent heat of vapourisation of the monomer, and the transfer of the monomer would thereby stop.

After the specified quantity of the monomer has been charged into the autoclave, the temperature of the constant-temperature bath is raised to 25 degrees C., and polymerisation of the batch thus charged is carried out at an agitation speed of 800 r.p.m. The polymerisation pressure is initially 40 kg./cm.² but begins to decrease after approximately 12 hours because of the reaction progress, dropping to 20 kg./cm.² in 27 hours after the start of polymerisation.

The polymerisation is stopped at this point, and after the still unreacted monomer has been discharged, the resulting polymer is filtered, washed with water, and then dried for 20 hours at a temperature of from 70 to 80 degrees C.

In an actual instance of practice in accordance with the above described procedure, 995 g. of a polymer was obtained, corresponding to a yield of 83 percent. This polymer was in the form of particles in a size range of from 5 to 40 microns, had an apparent density of 36 g./dl. and an intrinsic viscosity $\eta_{inh}$ of 1.30, and was found to be usable for spray coating and dispersion coating.

Furthermore, the above described procedure was repeated a number of times with different methanol/water ratios but with constant total weight of water and methanol, the other process conditions being as set forth above. The relationships between the quantities of the solvent (i.e., the weight of the solvent per 100 g. of water) and the resulting values of $\eta_{inh}$ and particle sizes were as indicated in the following tables.

| Weight of methanol (per 100 g. of water) (g.) | $\eta_{inh}$ | Particle size (micron) |
|---|---|---|
| 200 | 0.42 | 1–30 |
| 100 | 0.66 | 2–30 |
| 42 | 1.09 | 3–40 |
| 28 | 1.3 | 5–40 |
| 5 | 1.6 | 50–150 |
| 0 | 1.8 | 100–250 |

Example 2

An autoclave as specified in Example 1 is charged with 2,600 g. of water, 720 g. of methanol, 10.8 g. of methylcellulose, 12 g. of diisopropylperoxydicarbonate used as a polymerisation catalyst, and 2.4 g. of sodium pyrophosphate ($Na_4P_2O_7 \cdot 10H_2O$) and is then thoroughly evacuated. Then the autoclave is charged with 1.2 kg. of vinylidene fluoride monomer in the same manner as set forth in Example 1.

Polymerisation is then carried out according to the procedure as set forth in Example 1 except that, when the polymerisation pressure, which is initially 40 kg./cm.$^2$., reaches a value of from 30 to 35 kg./cm.$^2$ as the reaction progresses, 360 g. of the monomer is added anew in the same manner as described above. The polymerization pressure thereupon returns to 40 kg./cm.$^2$ but again drops to from 30 to 35 kg./cm.$^2$ after 10 hours. A second supplementary addition (400 g.) of the monomer is thereupon carried out.

After a total polymerisation time of approximately 70 hours, the polymerisation pressure becomes 20 kg./cm.$^2$, whereupon the reaction is stopped, and the resulting polymer is filtered, washed with water, and dried at from 70 to 80 degrees C. for 20 hours.

In an actual instance of practice of the above described procedure, 1,650 g. (85-percent yield) of a polymer was thus obtained. This polymer had a particle size ranging from 5 to 40 microns, an apparent density of 54.8 g./dl., and an intrinsic viscosity $\eta_{inh}$ of 1.30 and was found to produce excellent coating films when used in spray coating and dispersion coating.

Example 3

An autoclave as specified in Example 1 is charged with 2,650 g. of water, 350 g. of ethyl alcohol, 9 g. of methylcellulose, and 10 g. of diethylperoxydicarbonate and then with 1,000 g. of vinylidene fluoride monomer in the same manner as set forth in Example 1. Polymerisation of the charge is then started at 25 degrees C with agitation at 800 r.p.m. When the polymerisation pressure reaches 25 kg./cm.$^2$, a supplementary addition of 350 g. of the monomer is carried out, and a second supplementary addition of 300 g. of the monomer is carried out at a pressure of 35 kg./cm$^2$.

After a total polymerisation time of 50 hours and at a polymerisation pressure of 37 kg./cm.$^2$, the reaction is stopped, and the resulting polymer is filtered, washed with water, and then dried at a temperature of from 70 to 80 degrees C. for 20 hours.

In an actual instance of practice of the above described procedure, 1,320 g. (80-percent yield) of a polymer was thus obtained. This polymer had a particle size in the range of from 5 to 50 microns, an apparent density of 56 g./dl., and an intrinsic viscosity $\eta_{inh}$ of 0.55 and was found to be suitable for use in spray coating and dispersion coating.

Example 4

An autoclave as specified in Example 1 is charged with 3,380 g. of water, 120 g. of dioxane, 3.6 g. of methylcellulose, 12 g. of diisopropylperoxydicarbonate, and 2.4 g. of $Na_4P_2O_7 \cdot 10H_2O$ and then with 1,200 g. of vinylidene fluoride monomer, and the polymerisation process is started in the same manner as set forth in Example 1.

After 31 hours from the start of the polymerisation process, the pressure within the autoclave is at 20 kg./cm.$^2$, at which time a further 400 g. of the monomer is added to the batch, and then, when the pressure has again dropped to 20 kg./cm.$^2$, the reaction is stopped, and the resulting polymer is processed in the same manner as set forth in Example 1.

In an actual instance of practice, a polymer was thus obtained with a yield of 88 percent. This polymer had a particle size in the range of from 20 to 100 microns, an apparent density of 52 g./dl., and an intrinsic viscosity $\eta_{inh}$ of 0.70 and was found to be highly suitable as a polymer for fluid lining.

While certain specific details have been described above, it is obvious that many changes and modifications can be made therein without departing from the spirit and scope of the invention. Accordingly, it should be understood that the foregoing disclosure is intended to cover all such changes and modifications which do not constitute departures from the spirit and scope of the invention as set forth in the appended claims.

We claim:
1. In the production of polyvinylidene fluoride by suspension polymerization in the presence of a peroxydicarbonate compound as polymerization catalyst and a suspending agent, the improvement which comprises adding 0.1 to 200 parts by weight of a water-soluble solvent selected from the group consisting of methanol, ethanol, dioxane, and mixtures thereof per 100 parts by weight of water, as an agent for regulating the degree of polymerization and particle size of the resulting polymer product, and carrying out the suspension polymerization reaction at a temperature of from 10 to 30° C., thereby obtaining polyvinylidene fluoride having fine particle sizes of from 1 to 150 microns in diameter.

2. In the process according to claim 1 wherein the initial polymerization pressure is 40 kg./cm.$^2$ at an initial polymerization temperature of 25° C., the improvement according to claim 1.

3. In the process according to claim 1 wherein vinylidene fluoride monomer in a quantity of at least 30% of the initial charge of the monomer is supplementarily added at least once during the polymerization reaction to obtain the polymer product having a large apparent density, the improvement according to claim 1.

References Cited

UNITED STATES PATENTS

| 2,435,537 | 2/1948 | Ford et al. | 260—92.1 |
| 3,390,142 | 6/1968 | Benetta et al. | 260—92.8W |

FOREIGN PATENTS

| 1,419,741 | 12/1965 | France | 260—92.1 |
| 590,817 | 7/1947 | Great Britain | 260—92.1 |

JOSEPH L. SCHOFER, Primary Examiner

J. A. DONAHUE, Jr., Assistant Examiner